United States Patent [19]

Kriessmann et al.

[11] Patent Number: 5,272,188

[45] Date of Patent: Dec. 21, 1993

US005272188A

[54] WATER-DILUTABLE COATING BINDER COMBINATIONS WHICH CAN BE DEPOSITED CATHODICALLY, AND THEIR USE

[75] Inventors: Ingo Kriessmann; Willibald Paar; Franz Holzer; Walter Koch, all of Graz, Austria

[73] Assignee: Vianova Kunstharz, A.G., Werndorf, Austria

[21] Appl. No.: 923,484

[22] Filed: Aug. 3, 1992

[30] Foreign Application Priority Data

Aug. 2, 1991 [AT] Austria .................................. 1541/91

[51] Int. Cl.⁵ .......................... C08K 3/20; C08L 51/08
[52] U.S. Cl. .................... 523/412; 204/181.4; 523/414; 525/526; 525/530
[58] Field of Search ............... 525/530, 526; 523/412, 523/414; 204/181.4

[56] References Cited

U.S. PATENT DOCUMENTS 4,338,236 7/1982 Hazan ................................. 525/530

Primary Examiner—Melvyn I. Marquis
Assistant Examiner—D. Aylward
Attorney, Agent, or Firm—Breiner & Breiner

[57] ABSTRACT

Water-dilutable coating binder combinations which can be deposited cathodically, and based on epoxy resin-amine adducts, acrylate copolymers and crosslinking components are described. The binders are particularly suitable for formulation of water-dilutable primers and one-coat paints when deposited cathodically are described. In 3 to 30% by weight, based on the solids, of a basic epoxy resin-amine adduct (A) which is free from epoxide groups, 70 to 97% by weight of a monomer mixture (B), which consists of esters of (meth)acrylic acid which contain secondary or tertiary amino groups, of monoesters of (meth)acrylic acid with diols, of (meth)acrylic acid alkyl esters and if appropriate of aromatic vinyl monomers, is polymerized. Components (A) and (B) comprise at least 5% by weight, preferably 10 to 20% by weight, of identical aliphatic radicals having 7 to 18 carbon atoms. The baked films based on these products have a high degree of gloss and an excellent UV, washing agent, and corrosion resistance.

7 Claims, No Drawings

WATER-DILUTABLE COATING BINDER COMBINATIONS WHICH CAN BE DEPOSITED CATHODICALLY, AND THEIR USE

FIELD OF INVENTION

This invention relates to water-dilutable coating binder combinations which can be deposited cathodically and are based on epoxy resin-amine adducts, acrylate copolymers and crosslinking components, and to a process for preparing the binders. The binders are particularly suitable for formulation of water-dilutable primers and one-coat paints which can be deposited cathodically.

BACKGROUND OF INVENTION

Binders based on modified epoxy resin-amine adducts are known from U.S. Pat. No. 4,992,516, corresponding to DE-OS 36 28 121 A1. In comparison with pure acrylate binders, the products prepared according to the patent when applied as films and baked have an improved resistance to corrosion. However, other properties of the films, such as the UV resistance, the weathering resistance, or the alkali resistance of washing machine coatings, while adequate for many applications, are not as good as desired.

SUMMARY OF INVENTION

It has now been found that by using select raw materials in the binder components and by specific process steps during combination of the binder components, products are obtained which meet all the requirements for binders for commercial use as primers and one-coat paints with pale-colored, non-yellowing, glossy coating films which are corrosion resistant and at the same time resistant to washing agents, UV, and weathering.

The invention accordingly relates to a process for the preparation of water-dilutable coating binder combinations which can be deposited cathodically and are based on epoxy resin-amine adducts, acrylate copolymers and cross-linking components, which is characterized in that (A) 3 to 30% by weight, preferably 5 to 20% by weight, based on the solids, of a basic adduct of epoxy resins, which are optionally partly defunctionalized, and amino compounds which are free from epoxide groups, has an amine number of 50 to 170 mg KOH/g, preferably 90 to 130 mg KOH/g, and is present as a 10 to 40% strength by weight solution in a water-tolerant solvent which is inert to the reaction, (B) 70 to 97% by weight, preferably 80 to 95% by weight, of a monomer mixture which comprises (Ba) 7 to 20% by weight of esters of (meth)acrylic acid which contain secondary or tertiary amino groups, (Bb) 15 to 30% by weight of monoesters of (meth)acrylic acid with diols, which contain alkylene radicals having 2 to 6 carbon atoms and/or oxyalkylene radicals having 4 to 12 carbon atoms, (Bc) 50 to 78% by weight of (meth)acrylic acid alkyl esters, the alkyl radicals of which contain 1 to 18 carbon atoms, and (Bd) up to 10% by weight of aromatic vinyl monomers, preferably styrene, are subjected to free radical polymerization in a known manner, and 60 to 80% by weight, based on the solids, of the resultant solution, i.e., component (AB), is mixed if desired after reduction of the solvent content and/or partial protonation of the amino groups with acids, preferably with formic, acetic or lactic acid, with (C) 20 to 40% by weight, based on the solids, of a cross-linking component, and the coating binder combination thus obtained is diluted with deionized water to a solids content suitable for further processing, with the provisos that components (A) and (B) in each case comprise at least 5% by weight, preferably 10 to 20% by weight, of identical aliphatic radicals having 7 to 18 carbon atoms; that component (AB) has an amine number of 30 to 90 mg KOH/g, preferably 40 to 70 mg KOH/g, and a hydroxyl number of 80 to 150 mg KOH/g, and that the sums of the percentage figures of components (A) and (B), (Ba) to (Bd), and (AB) and (C) are in each case 100.

The invention furthermore relates to the coating binder combinations prepared by this process, and to their use for the formulation of water-dilutable primers and one-coat paints which can be deposited cathodically.

Due to the polymerization process and the specific composition of the raw materials, in particular due to the presence of a content of identical aliphatic radicals having 7 to 18 carbon atoms in each of components (A) and (B), and the resulting compatibility, the properties of the baked films based on the products prepared according to the invention, such as the degree of gloss, the UV resistance, the weathering resistance, the washing agent resistance and the corrosion resistance can be optimized accordingly by the choice of the particular raw materials.

The homogeneity of the coating binder combinations is also improved dramatically by the fact that at the time of addition of component (C), a largely anhydrous medium is present, apart from the relatively small amount of water which is introduced during partial neutralization of the binder components via aqueous solutions of neutralizing agents. As a result of this process step, it is also possible to mix in hydrophobic crosslinking components, such as water-incompatible amino resins, masked polyisocyanate curing agents or other crosslinking agents. The coating binder combinations also remain homogeneous and stable in the dilute aqueous primers or one-coat paints.

DESCRIPTION OF COMPONENTS

Component (A) is a basic modified epoxy resin which contains at least one amino group per molecule and has an amine number of 50 to 170 mg KOH/g, preferably 90 to 130 mg KOH/g. An essential feature of this component is the presence of at least 5% by weight, preferably 10 to 20% by weight, of aliphatic radicals, preferably present as end or side chains, which have 7 to 18 carbon atoms and are identical to the aliphatic radicals likewise present in component (B). Epoxy resin-amine adducts based on aromatic and aliphatic diepoxy resins or other epoxide compounds, and modifications thereof, are described in the literature.

The longer-chain aliphatic radicals which are essential to the present invention are preferably introduced into component (A) by using alkylamines, such as 2-ethylhexylamine or stearylamine, and/or by reaction of corresponding alkyl glycidyl ethers and/or alkyl glycidyl esters with primary and/or secondary amino groups of epoxy resin-amine adducts. The aliphatic radicals can also be incorporated by reaction of diisocyanates which are semi-blocked or half-blocked by fatty alcohols and- /or fatty amines with hydroxyl and/or amino groups of the epoxy resin-amine adducts. There is furthermore the possibility of introducing fatty alcohols or fatty acids into component (A) by esterification, or of reacting alkyl glycidyl ethers and/or alkyl glycidyl esters with carboxyl groups. Compounds which carry corresponding side chains, such as are described, for example, in U.S. Pat. No. 4,992,516, can also be used to lengthen aromatic epoxy resins.

The solution of component (A) in a solvent which is inert in the subsequent polymerization but water-dilutable or at least water-tolerant, such as in alkanols, glycol ethers or glycol esters, serves as the reaction medium for the preparation of component (B). In this preparation, a monomer mixture which comprises (Ba) 7 to 20% by weight of esters of (meth)acrylic acid which contain secondary or tertiary amino groups, (Bb) 15 to 30% by weight of monoesters of (meth)acrylic acid with diols, which contain alkylene radicals having 2 to 6 carbon atoms and/or oxyalkylene radicals having 4 to 12 carbon atoms, (Bc) 50 to 78% by weight of (meth)acrylic acid alkyl esters, the alkyl radicals of which contain 1 to 18 carbon atoms, and (Bd) up to 10% by weight of aromatic vinyl monomers, preferably styrene, wherein the sum of the percentage figures of (Ba) to (Bd) must be 100, is subjected to free radical polymerization in the solution of component (A) in a known manner.

According to the invention, the reaction mixture of components (A) and (B) consists of 3 to 30% by weight, preferably 5 to 20% by weight, based on the solids, of component (A) and 70 to 97% by weight, preferably 80 to 95% by weight, of component (B), wherein the sum of the percentage figures of (A) and (B) must likewise be 100. The starting substances are furthermore chosen in a ratio of amounts such that the components (AB) have an amine number of 30 to 90 mg KOH/g, preferably 40 to 70 mg KOH/g, and a hydroxyl number of 80 to 150 mg KOH/g.

N-monoalkyl- and/or N-dialkyl-aminoalkyl (meth)acrylates and/or the corresponding N-alkanol compounds are preferably employed as monomers (Ba) which contain nitrogen groups. If other such monomers are used, the desired profile of properties of the coating binder in respect to yellowing, adhesive strength, elasticity of the films must be taken into account.

When choosing the monomers of group (Bb) and (Bc), it is necessary to take into account the requirement according to the invention that the monomer mixture has a composition such that at least 5% by weight, preferably 10 to 20% by weight, of aliphatic radicals having 7 to 18 carbon atoms which are identical to the radicals present in component (A) are present.

Components (AB) as thus prepared are mixed with crosslinking component (C), at times after removal of some of the auxiliary solvent employed and/or after partial protonation of the amino groups with acids, preferably with formic, acetic or lactic acid, if desired, but before addition of water apart from the amount of water usually contained in the neutralizing agent. Mixing is carried out in a ratio of 60 to 80% by weight of component (AB) to 20 to 40% by weight of component (C), based on the solid resin. Component (C) are hydrophilic or hydrophobic crosslinking agents which are customary for this class of binder which effect curing by transesterification, transetherification or transurethanization, of the coating films which are deposited.

The coating binder combinations are finally diluted, in a known manner, with deionized water to a solids content suitable for further processing. The subsequent process steps for the preparation of coatings are known to one skilled in the art.

PRESENTLY PREFERRED EMBODIMENTS

The present examples illustrate the invention, without limiting it in its scope. All the data in parts or percentages relate to weight units, unless stated otherwise. The abbreviation EEW denotes epoxide equivalent weight of the epoxy resins used.

1. Preparation of the Binder Components 1.1 Component (A): Modified epoxy resin-amine adducts 1.1.1. Preparation of the modifiers carrying aliphatic groups (V1 to V3)

Modifier (V1): 577 g (3.1 mol) of 2-ethylhexyl glycidyl ether are added to a solution of 103 g (1 mol) of diethylenetriamine and 170 g of methoxypropanol at 60° C. in the course of 2 hours, and the mixture is reacted to an EPA value as defined hereinafter of 3.70. A mixture of 190 g of a bisphenol A epoxy resin (EEW about 190) and 48 g of methoxypropanol is then added at 60° C. in the course of 2 hours, and the reaction is continued to an EPA value of 2.76. The solid resin content is 80% by weight.

Determination of the EPA Value: (Sum of the oxirane and amino groups in milliequivalents)

0.2 to 0.4 g of resin is accurately weighed in milligrams and melted in 5 drops of methoxypropanol. After cooling, 25 ml of a mixture of methylene chloride and glacial acetic acid (4:1 parts by volume) are added. The resin is dissolved, with gentle heating. 0.5 g of tetrabutylammonium iodide and 3 drops of crystal violet solution are added at room temperature. The mixture is titrated with perchloric acid 0.1N solution in glacial acetic acid until the color changes from blue-violet to grass-green, i.e., no blue hue. A blank value (without resin) is determined in the same manner.

$$\text{EPA value} = \frac{(A - B) \times 0.1 \times F}{\text{weight (g)}}$$

A = ml of perchloric acid 0.1N solution for the sample;

B = ml of perchloric acid 0.1N solution for the blank value;

F = factor of the perchloric acid 0.1N solution.

Determination of the Factor (F) With Potassium Hydrogen Phthalate

About 200 mg of potassium hydrogen phthalate (analytical grade) are accurately weighed to 0.1 mg in a conical flask. After addition of 30 ml of glacial acetic acid and 3 drops of crystal violet solution, the mixture is titrated with approximately 0.1 molar perchloric acid solution until the color changes from blue-violet to grass-green.

$$F = \frac{W}{C \times 20.422}$$

W = weight of potassium hydrogen phthalate;

C = ml of the approximately 0.1 molar solution of perchloric acid in glacial acetic acid.

Modifier (V2): 1010 g (3.1 mol) of stearyl glycidyl ether in 129 g of methoxypropanol are added to a solution of 103 g (1 mol) of diethylenetriamine and 150 g of methoxypropanol at 60° C. in the course of 2 hours, and the mixture is reacted to an EPA value of 2.20. A mixture of 190 g of a bisphenol A epoxy resin (EEW 190) and 48 g of methoxypropanol is then added at 60° C. in the course of 2 hours, and the reaction is continued to an EPA value of 1.84. The solid resin content is 80% by weight.

Modifier (V3): 372 g (2 mol) of ethylhexyl glycidyl ether are added to a solution of 104 g (1 mol) of aminoethylethanolamine and 119 g of methoxypropanol at 60° C. in the course of 2 hours, and the mixture is reacted to an EPA value of 3.36. The solid resin content is 80% by weight.

1.1.2. Preparation of Components (A)

Component (A1): 652 g (0.6 mol) of modifier (V1), 80% strength, 570 g of a bisphenol A diepoxy resin (EEW 190), 77 g (0.6 mol) of 2-ethylhexylamine and 162 g of methoxypropanol are reacted at 60° C. in a first reaction stage in a suitable reaction vessel until the NH-functionality has been converted completely, that is to say to an EPA value of 2.15. 1357 g (2 mol) of a 70% strength solution of a bisphenol A diepoxy resin (EEW 475) in methoxypropanol and 189 g (1.8 mol) of diethanolamine are then added, and the mixture is again reacted until the NH-functionality has been converted, that is to say to an EPA value of 1.70. In a third reaction stage, the remaining oxirane groups are reacted with 78 g (1.66 mol) of N,N-diethylaminopropylamine at 60° C. for 2 hours, at 90° C. for a further hour and at 120° C. for a further 3 hours, to an EPA value of 1.55, and the mixture is diluted with methoxypropanol to a solid resin content of 65% by weight.

Components (A2) to (A4): Components (A2) to (A4) are prepared in the same manner as in (A1) from the data summarized in Table 1. In the case of component (A3), reaction stage 4 is carried out such that after reaction stage 3, methoxypropanol and a polyoxypropylene glycol diglycidyl ether (EEW 200, commercial name DER ® 736, Dow Chemical) are added at 120° C. and this temperature is maintained for 3 to 5 hours until the desired EPA value is reached. Table 1 is as follows:

TABLE 1

| Component | A1 | A2 | A3 | A4 |
|---|---|---|---|---|
| Stage 1 | | | | |
| V1 solution (80% strength in MP) | 652 | 652 | 325 | — |
| V2 solution (80% strength in MP) | — | — | — | 489 |
| Epoxy resin EEW 190 | 570 | 722 | 380 | 570 |
| 2-Ethylhexylamine | 77 | 122 | 65 | — |
| Stearylamine | — | — | — | 202 |
| MP | 162 | 455 | 237 | 193 |
| EPA value | 2.46 | 2.08 | 2.09 | 1.96 |
| Stage 2 | | | | |
| Epoxy resin EEW 475 (75% strength in MP) | 1330 | 1837 | 1647 | 1330 |
| MP | — | 268 | 223 | — |
| V3 solution 80% strength in MP) | — | 952 | 536 | — |
| Monoethanolamine | — | — | 68 | — |
| Diethanolamine | 189 | — | — | 189 |
| EPA value | 1.91 | 1.71 | 1.61 | 1.67 |
| Stage 3 | | | | |
| N,N-Diethylamino- | 78 | 143 | 78 | 78 |

TABLE 1-continued

| Component | A1 | A2 | A3 | A4 |
|---|---|---|---|---|
| propylamine | | | | |
| MP | — | 61 | 33 | — |
| EPA value | 1.76 | 1.56 | 1.56 | 1.52 |
| Stage 4 | | | | |
| Epoxy resin EEW 200 | — | — | 132 | — |
| MP | — | — | 57 | — |
| EPA value | — | — | 1.40 | — |

MP = methoxypropanol

Component (A5) 500 g of a bisphenol A diepoxy resin (EEW about 500) are dissolved in 214 g of methoxypropanol and reacted with 83 g (0.3 mol) of a half-ester of phthalic anhydride and 2-ethylhexanol at 110° C. in the presence of 0.5 g of triethylamine as a catalyst, to an acid number of less than 3 mg KOH/g. 120 g (0.4 mol) of an NH-functional oxazolidine of aminoethylethanolamine, 2-ethylhexyl acrylate and formaldehyde, and 26 g (0.2 mol) of diethylaminopropylamine are then added, and the batch is reacted at 80° C. to an epoxide value of practically zero. The batch is diluted with 181 parts of methoxypropanol to a solid resin content of 70% by weight.

The parameters for components (A1) to (A5) are summarized in the following Table 2.

TABLE 2

| Component | A1 | A2 | A3 | A4 | A5 |
|---|---|---|---|---|---|
| Solid resin content % by weight | 65 | 65 | 70 | 65 | 70 |
| Amine number (mg KOH/g of solid resin | 124 | 125 | 112 | 107 | 92 |
| Hydroxyl number (mg KOH/g of solid resin) | 257 | 214 | 220 | 228 | 77 |
| % by weight of ethylhexyl radicals | 11.0 | 18.6 | 14.5 | — | 10.8 |
| % by weight of stearyl radicals | — | — | — | 18.5 | — |

1.2. Preparation of Components (AB)

Component (AB1): 308 parts of component (A1), 65% strength, and 444 parts of methoxypropanol are heated to 85° C. in a reaction vessel which is suitable for free radical polymerization and is equipped with a stirrer, reflux condenser, feed vessel, nitrogen flushing and temperature measurement. A mixture of 84 parts of dimethylaminoethyl methacrylate, 159 parts of 2-hydroxyethyl methacrylate, 306 parts of n-butyl methacrylate, 106 parts of methyl methacrylate, 145 parts of 2-ethylhexyl acrylate, 24 parts of azobisisobutyronitrile and 2 parts of tert-dodecylmercaptan is then added uniformly in the course of 4 hours. The temperature is then increased to 90° C. and kept at this value for 2 hours. After addition of a further 10 parts of azobisisobutyronitrile, the batch is kept at 90° C. for a further 3 hours, to a degree of polymerization of at least 99.5%.

Components (AB2) to (AB10); Comparison Example

Further components (AB) are prepared according to the proportions shown in Table 3 in the same manner. The parameters for all the products are also summarized in Table 3. Explanation of the abbreviations in Table 3:

| | |
|---|---|
| DAMA | dimethylaminoethyl methacrylate |
| BAMA | N-tert-butylaminoethyl methacrylate |
| HEMA | 2-hydroxyethyl methacrylate |

-continued

| | |
|---|---|
| HEA | 2-hydroxyethyl acrylate |
| HBA | 4-hydroxyethyl acrylate |
| TGMA | tripropylene glycol methacrylate |
| MMA | methyl methacrylate |
| BMA | n-butyl methacrylate |
| BA | n-butyl acrylate |
| EHA | 2-ethylhexyl acrylate |
| SMA | stearyl methacrylate |
| ST | styrene |
| DDM | tert-dodecylmercapto (regulator) |
| AIBN | azobisisobutyronitrile (starter) |

Table 3 is as follows:

TABLE 3

| | AB1 | AB2 | AB3 | AB4 | AB5 | AB6 | AB7 | AB8 | AB9 | AB10 | ABV Comparison |
|---|---|---|---|---|---|---|---|---|---|---|---|
| (A1) (65%) | 308 | 77 | — | — | — | — | 154 | — | — | — | — |
| (A2) (65%) | — | — | 154 | 462 | — | — | — | — | — | — | 154 |
| (A3) (70%) | — | — | — | — | 143 | 214 | — | — | — | — | — |
| (A4) (65%) | — | — | — | — | — | — | — | 154 | 77 | — | — |
| (A5) (70%) | — | — | — | — | — | — | — | — | — | 214 | — |
| Methoxypropanol | 444 | — | 501 | 280 | 515 | — | 503 | 501 | 532 | 491 | 501 |
| Butoxyethanol | — | 530 | — | — | — | 489 | — | — | — | — | — |
| DAMA | 84 | — | 80 | 112 | 67 | 107 | 73 | — | 115 | 98 | 80 |
| BAMA | — | 180 | — | — | — | — | — | 140 | — | — | — |
| HEMA | 159 | 250 | — | — | 200 | 235 | — | — | 240 | 205 | — |
| HEA | — | — | — | 168 | — | — | 228 | — | — | — | 207 |
| HBA | — | — | 154 | — | — | — | — | 205 | — | — | — |
| TGMA | — | — | — | — | 70 | — | — | — | — | — | — |
| MMA | 106 | — | 300 | 130 | 248 | — | 249 | — | 260 | 180 | 350 |
| BMA | 306 | 280 | — | 160 | 100 | 263 | 250 | 295 | — | 200 | — |
| BA | — | — | 100 | — | — | — | — | — | 230 | — | 263 |
| EHA | 145 | 200 | 266 | 130 | 215 | 185 | 100 | — | — | 167 | — |
| SMA | — | — | — | — | — | — | — | 180 | 105 | — | — |
| ST | — | 40 | — | — | — | 60 | — | 80 | — | — | — |
| DDM | 2 | 3 | 2 | — | 2 | 3 | — | 2 | 3 | 2 | 2 |
| AIBN | 24 | 32 | 28 | 35 | 34 | 27 | 34 | 30 | 35 | 28 | 29 |
| Parameters: | | | | | | | | | | | |
| Amine number (mg KOH/g) | 55 | 60 | 41 | 77 | 35 | 55 | 38 | 53 | 46 | 49 | 41 |
| Hydroxyl number (mg KOH/g) | 119 | 120 | 81 | 145 | 113 | 134 | 136 | 103 | 115 | 100 | 121 |
| Solid resin content (%) | 65 | 65 | 65 | 70 | 65 | 65 | 65 | 65 | 65 | 65 | 65 |
| Content of 2-ethylhexyl radicals in the acrylate portion (% by weight) | 11.1 | 12.9 | 18.2 | 11.4 | 14.7 | 13.4 | 6.1 | — | — | 10.3 | — |
| Content of stearyl radicals in the acrylate portion (% by weight) | — | — | — | — | — | — | — | 13.5 | 7.9 | — | — |

1.3. Preparation of Crosslinking Components (C1) to (C3)

Crosslinking Component (C1): 2085 parts (3.6 mol) of a trimeric hexamethylenediisocyanate (DESMODUR® N, 100%, Bayer, FRG) are dissolved in 763 parts of methoxypropyl acetate in a suitable reaction vessel, and 947 parts (10.9 mol) of methyl ethyl ketoxime are added, while stirring, during which the temperature should not exceed 45° C. When the exothermic reaction has subsided, the batch is kept at 50° C. until the NCO-groups have reacted completely. The product has a solids content of 80% by weight.

Crosslinking Component (C2): 486 parts (3 mol) of diethylene glycol monobutyl ether are slowly added to a solution of 666 parts (3 mol) of isophorone diisocyanate and 0.5 part of dibutyltin dilaurate in 200 parts of methoxypropyl acetate at a maximum temperature of 35° C. The batch is kept at 35° C. until an NCO-value of 9.3 is reached. After heating to 50° C., a solution of 134 parts (1 mol) of trimethylolpropane in 229 parts of methoxypropyl acetate is slowly added and the batch is kept at 80° C. until the NCO-groups have reacted completely. The solids content is 75% by weight.

Crosslinking Component (C3): 396 g (3 mol) of dimethylmalonate and 134 g (1 mol) of trimethylolpropane are reacted with 1.1 g of zinc octoate (8% Zn content) at 130° C. for 10 hours, about 90 g of methanol escaping as a distillate. The finished polyfunctional ester is a colorless liquid having a hydroxyl number of 16 mg KOH/g.

Crosslinking Component (C4): Moderately to highly reactive amino resins, such as Cymel® 1158 or Cymel® 1141 from American Cyanamid Company, can also be employed as crosslinking components.

2. Examples 1–10 and Comparison Examples VB1 and VB2

2.1. Preparation of the Binder Combinations

Binder combinations were obtained from binder components (AB) and (C) by mixing the amounts stated in Table 4 and partial neutralization with formic acid, and were tested for their appearance. Table 4 is as follows:

TABLE 4

| Example | Binder Combination (1) | | (2) | (3) | (4) | (5) |
|---|---|---|---|---|---|---|
| | Component (AB), parts | Component (C), parts | | | | |
| 1 | 70 (AB1) | 30 (C1) | 40 | — | 50 | 20 |
| 1a | 70 (AB1)(+) | 30 (C1) | 40 | — | 50 | 20 |
| 2 | 75 (AB2) | 25 (C1) | 35 | — | 45 | 18 |

TABLE 4-continued

| | Binder Combination (1) | | | | | |
|---|---|---|---|---|---|---|
| Example | Component (AB), parts | Component (C), parts | (2) | (3) | (4) | (5) |
| 3 | 65 (AB3) | 35 (C2) | 45 | 0.8 Sn | 55 | 18 |
| 3a | 65 (AB3)(+) | 35 (C2) | 45 | 0.8 Sn | 55 | 18 |
| 4 | 80 (AB4) | 20 (C3) | 35 | 0.5 Pb | 50 | 18 |
| 4a | 80 (AB4)(+) | 20 (C3) | 35 | 0.5 Pb | 50 | 18 |
| 5 | 70 (AB5) | 30 (C1) | 40 | — | 40 | 20 |
| 6 | 70 (AB6) | 30 (C1) | 40 | — | 30 | 22 |
| 7 | 75 (AB7) | 25 (C3) | 30 | 1.0 Sn | 35 | 18 |
| 8 | 70 (AB8) | 30 (C2) | 35 | 1.0 Sn | 50 | 20 |
| 9 | 75 (AB9) | 25 (C3) | 40 | 1.0 Pb | 60 | 18 |
| 10 | 70 (AB10) | 30 (C2) | 35 | 1.0 Sn | 50 | 20 |
| VB1 | 75 (ABV) | 25 (C1) | 45 | 1.0 Pb | 45 | 18 |
| VB2 | corresponds to Example 2 from DE-OS 36 28 121 A1. | | | | | |

Remarks on Table 4:
(1) The numerical data relate to parts of solid resin. All the binder combinations in the examples according to the invention were medium-viscosity, clear resin solutions. On the other hand, the mixtures according to the Comparison Examples (VB1) and (VB2) already gave cloudy solutions in the batch.
(2) Amount of neutralizing agent: Millimol of formic acid/100 g of solid resin of component (AB). In the case of components (AB) labelled (+), the neutralizing agent was already added before component (C) was added.
(3) Catalyzing of the coatings -
Parts of Sn (metal) as dibutyltin dilaurate
Parts of Pb (metal) as lead octoate
(4) Parts of TiO₂ pigment.
(5) Solids content of the coatings in % by weight (deionized water as a diluent).

2.2. Testing of the Binder Combinations

In accordance with the data in Table 4, coatings pigmented with titanium dioxide (rutile) were prepared and, after neutralization and if appropriate addition of a catalyst, were diluted with water to the stated solids content. After an homogenization time of 15 hours, the coatings were deposited cathodically in the customary manner onto sheet steel pretreated with zinc phosphate. The coating films, which were baked at 180° C. for 25 minutes and had a dry film coating thickness of 22±2 μm, were tested in the manner described below:

1. UV resistance: 1000 hours of UV exposure on a UV CON UC-327-2, UV exposure apparatus from Atlas Electric Devices Company, Chicago, Ill., U.S.A.; UV CON (gloss measurement as in 4 below).

2. Washing agent test: A 1% strength solution of a domestic detergent is heated to 76° C. The test sheet is left in the solution at this temperature for 8 hours. The heating is then switched off for a further 16 hours (=1 cycle). The test is ended either if the film softens or if blisters occur.

3. Salt spray test: ASTM-B 117-64, rust creepage data in mm.

4. Gloss: Measured with a gonioreflectometer GR-COMP. (Paar, Austria); measurement angle 60°, % of standard.

The test results are summarized in Table 5 as follows:

TABLE 5

| Example | Gloss (Without Exposure) | UV Resistance | Washing Agent Test, Cycle | Salt Spray test 1000 Hours mm |
|---|---|---|---|---|
| 1/1a | 65 | 60 | above 25 | 2.5 |
| 2 | 70 | 70 | above 25 | 2 |
| 3/3a | 75 | 70 | 20 | 1 |
| 4/4a | 65 | 55 | above 25 | 1 |
| 5 | 70 | 70 | above 25 | 1.5 |
| 6 | 65 | 60 | above 25 | 3 |
| 7 | 70 | 65 | above 25 | 2 |
| 8 | 75 | 75 | 22 | 2 |
| 9 | 80 | 75 | above 25 | 3 |
| 10 | 65 | 60 | 23 | 2.5 |
| VB1 | 40 | 30 | 14 | 5.5 |
| VB2+) | 58 | 35 | 12 | 6 |

+)Example 2 from DE-OS 36 28 121 A1
All the baked films are free from yellowing.

As will be apparently to one skilled in the art, various modifications can be made within the scope of the aforesaid description. Such modifications being within the ability of one skilled in the art form a part of the present invention and are embraced by the appended claims.

It is claimed:

1. Process for the preparation of water-dilutable coating binder combinations which can be deposited cathodically and are based on epoxy resin-amine adducts, acrylate, copolymers and crosslinking components, wherein
   (A) in 3 to 30% by weight, based on the solids, of a basic adduct of epoxy resins, which has an amine number of 50 to 170 mg KOH/g and is present as a 10 to 40% strength by weight solution in a water-tolerant solvent which is inert to the reaction (component A),
   (B) 70 to 97% by weight of a monomer mixture which comprises
      (Ba) 7 to 20% by weight of esters of (meth)acrylic acid which contain secondary or tertiary amino groups,
      (Bb) 15 to 30% by weight of monoesters of (meth)acrylic acid with diols, which contain alkylene radicals having 2 to 6 carbon atoms and/or oxyalkylene radicals having 4 to 12 carbon atoms,
      (Bc) 50 to 78% by weight of (meth)acrylic acid alkyl esters, the alkyl radicals of which contain 1 to 18 carbon atoms, and
      (Bd) up to 10% by weight of aromatic vinyl monomers (component B), is subjected to free radical polymerization, and 60 to 80% by weight, based on the solids, of a solution of component (AB) is mixed with
   (C) 20 to 40% by weight, based on the solids, of a cross-linking component (component C), and the coating binder combination thus obtained is diluted with deionized water to a solids content suitable for further processing,
with the provisos that components (A) and (B) in each case comprise at least 5% by weight of identical aliphatic radicals having 7 to 18 carbon atoms, that component (AB) has an amine number of 30 to 90 mg KOH/g and a hydroxyl number of 80 to 150 mg KOH/g, and that the sums of the percentage figures of components (A) and (B), (Ba) to (Bd), and (AB) and (C) are in each case 100.

2. Process according to claim 1, wherein the epoxy resin-amine adducts of component (A) have been modified with alkylamines, the alkyl radicals of which contain 7 to 18 carbon atoms, or with alkyl glycidyl ethers or alkyl glycidyl esters, the alkyl radicals of which contain 7 to 18 carbon atoms.

3. Process according to claim 1, wherein N-monoalkyl- or N-dialkyl-aminoalkyl (meth)acrylates or the corresponding N-alkanol compounds are employed as component (Ba).

4. The process of claim 1 wherein component (A) is present in an amount of from 5 to 20% by weight and has an amine number of 90 to 130 mg KOH/g, component (B) is present at from 80 to 95% by weight, and the amine number of component (AB) is from 40 to 70 mg KOH/g.

5. The process of claim 1 wherein component (AB) before mixing with component (C) has been subjected to partial protonization of the amino groups with an acid.

6. The process of claim 5 wherein the protonating acid is formic acid or acetic acid or lactic acid.

7. The water-dilutable binder combinations prepared according to any one of claims 1-6.

* * * * *